United States Patent [19]
Atienza

[11] Patent Number: 5,134,784
[45] Date of Patent: Aug. 4, 1992

[54] MEASURING TAPE DEVICE

[76] Inventor: Alexander C. Atienza, 640 Hind Iuka Dr., Honolulu, Hi. 96821

[21] Appl. No.: 737,687

[22] Filed: Jul. 30, 1991

Related U.S. Application Data

[63] Continuation-in-part of Ser. No. 360,723, Jun. 2, 1989, abandoned.

[51] Int. Cl.⁵ .................................................. G01B 3/10
[52] U.S. Cl. ...................................... 33/668; 33/761; 33/769
[58] Field of Search ................. 33/668, 770, 755, 758, 33/761, 767, 768, 769; D10/72

[56] References Cited

U.S. PATENT DOCUMENTS

| D. 255,881 | 7/1980 | Atienza | D10/72 |
|---|---|---|---|
| 2,624,120 | 1/1953 | Mills | 33/668 |
| 3,526,964 | 9/1970 | Clark, Jr. | 33/761 |
| 4,071,957 | 2/1978 | Sumption et al. | 33/761 |
| 4,296,554 | 10/1981 | Hammerstrom | 33/668 |
| 4,580,347 | 4/1986 | McKnight | 33/668 |
| 4,630,376 | 12/1986 | Pentecost | 33/668 |
| 4,965,941 | 10/1990 | Agostinacci | 33/668 |
| 4,976,037 | 12/1990 | Hines | 33/668 |

FOREIGN PATENT DOCUMENTS

| 1470403 | 2/1967 | France | 33/761 |
|---|---|---|---|
| 1522418 | 3/1968 | France | 33/761 |
| 1550437 | 12/1968 | France | 33/761 |

*Primary Examiner*—William A. Cuchlinski, Jr.
*Assistant Examiner*—C. W. Fulton
*Attorney, Agent, or Firm*—Donald Diamond

[57] ABSTRACT

A measuring tape device includes a housing having a base, a rearward end, a forward end, and opposite sides. A wound length of tape is disposed in the housing and is taken out in a direction in line with the base. A first mounting hole is disposed in the housing and mounts a scribing pen in a first, stowed position, and a second mounting hole is disposed in the base of the housing at the forward end and transverse the direction of tape take out, and mounts the scribing pin in a second, operative position. The scribing pin in the second operative position has a pointed end extending downwardly from the base.

7 Claims, 2 Drawing Sheets

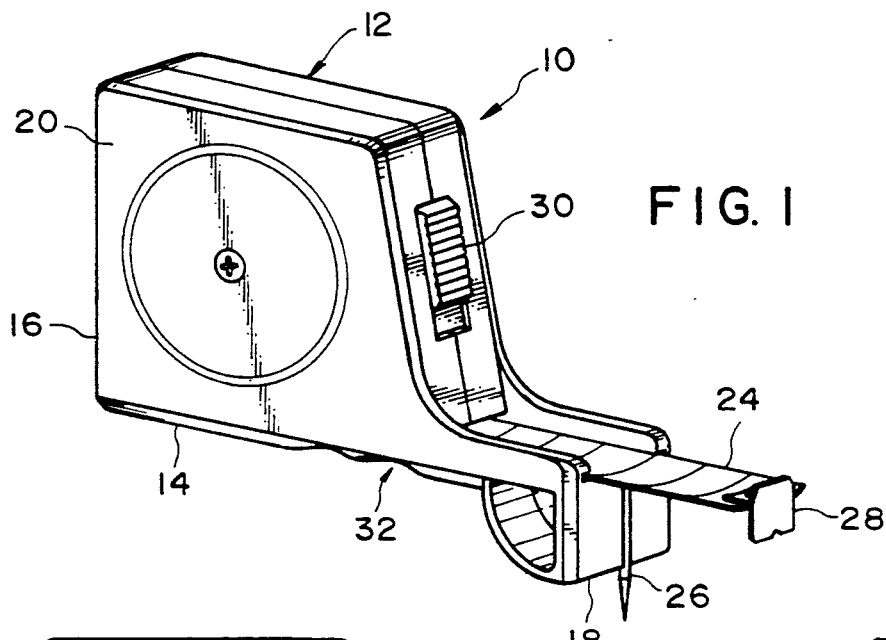
FIG. 1
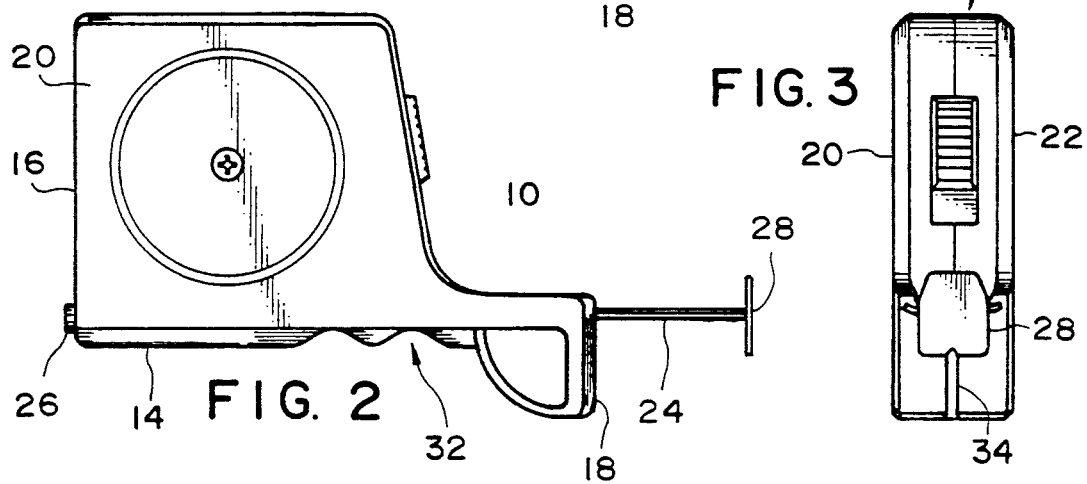
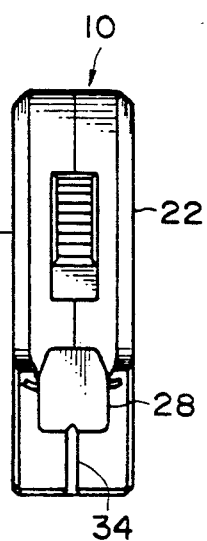
FIG. 2
FIG. 3
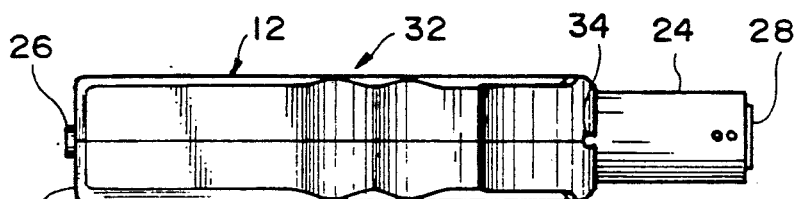
FIG. 4
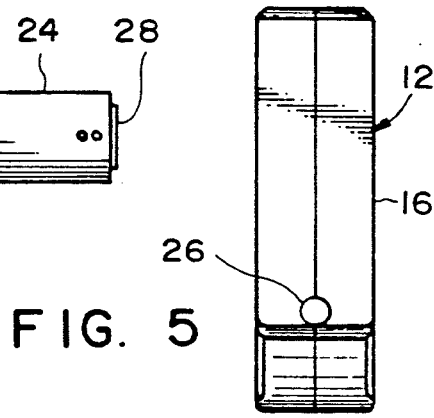
FIG. 5

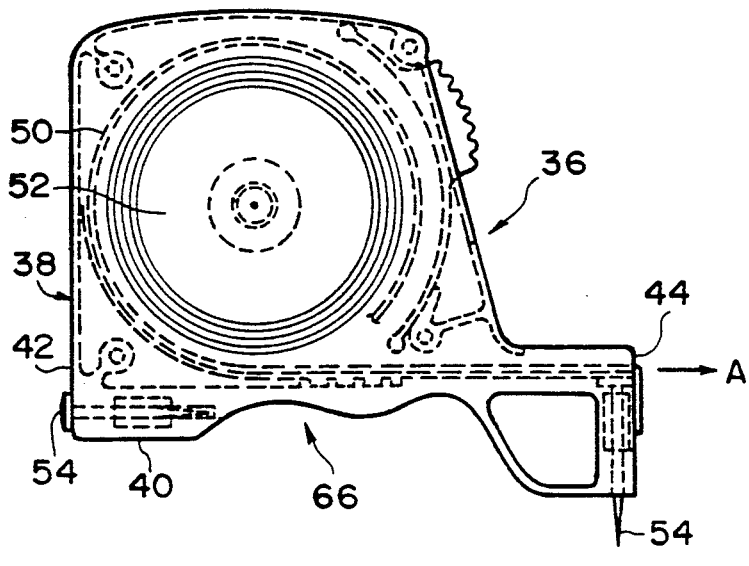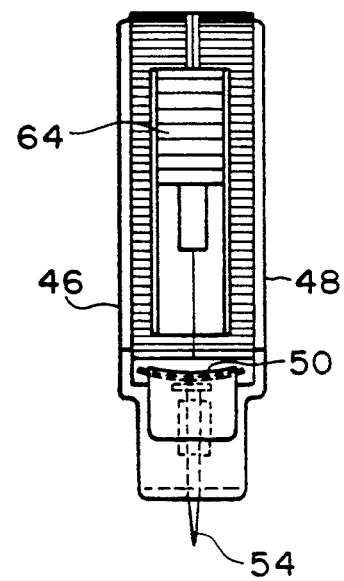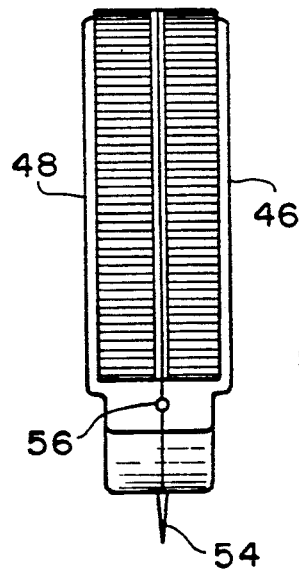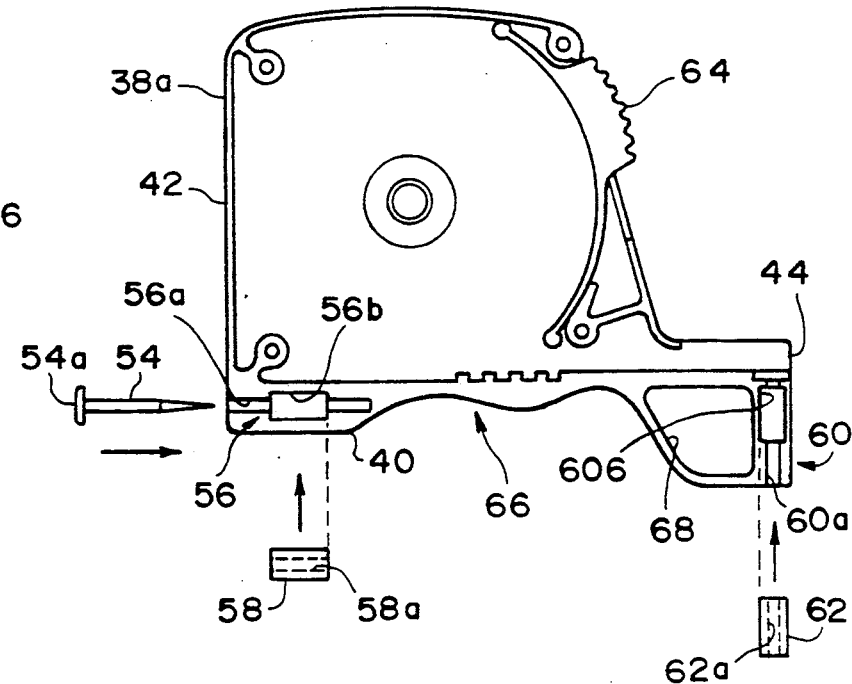

MEASURING TAPE DEVICE

BACKGROUND OF THE INVENTION

Related Applications the present application is a continuation-in-part of my co-pending design application, U.S. Ser. No.: 07/360,723, filed Jun. 2, 1989, now abandoned.

FIELD OF THE INVENTION

The present invention relates generally to capentry tools and, more specifically, to a measuring tape device having a stowable scribing pin.

DESCRIPTION OF THE RELATED ART

Standard measuring tape device include a length of tape wound on a spool with a spring return mechanism so that after the tape is taken out of a housing of the measuring tape device, the spring return mechanism automatically retracts the tape into the housing. The housing typically includes a flat base of known lengths so that in some measuring situations, the length of the base can be added to the length of the tape taken out of the housing. A locking mechanism, typically a sliding button, locks the tape for the purpose of reading the length of the deployed tape.

Although the prior art spring return mechanism and locking mechanisms are adequate to achieve the purpose of a measuring tape device, the housings tend to be difficult to handle and sometimes hamper the taking of measurements. For example, in cases where the carpenter is working alone, it is difficult to hold both the distal end of the tape and the housing simultaneously. The end of the tape is usually provided with a right-angled, down-turned lip, provided at the zero reading on the tape, which can be used to source the tape on an object, such as the corner of a two inch by four inch beam. Unfortunately, not all measurements are from locations that have objects which can secure the end of the tape as aforementioned. Moreover, if the distal end of the tape is secured, the carpenter must then mark off a measured distance with a scribing tool, such as a pencil. This can be awkward while simultaneously holding the housing and maintaining the secured state of the distal end of the tape, which usually requires a constant applied tension to the tape.

Also, accurate markings of measured distances are difficult to make, as they require the carpenter to hold a pencil on the tape and then move the tape and the pencil simultaneously.

SUMMARY OF THE INVENTION

An object of the present invention is therefore to provide a measuring tape device that is easier to handle than those of the prior art that have flat bases.

Another object of the present invention is to provide a measuring tape device wich is easier to make measured markings.

Another object of the present invention is to provide a measuring tape device which is capable of scribing circles, or straight lines or pivoting from a fixed position.

These and other objects of the invention are met by providing a measuring tape device which includes a housing having a base, a rearward end, a forward end, and opposite sides, a wound length of tape disposed in the housing and being taken out in a direction in line wiht the base, a scribing pin, a first mounting hole disposed in the housing and mounting said scribing pin in a first, stowed position, and a second mounting hole disposed in the base of the housing at the forward end and transverse to the direction of tape take-out and mounting said scribing pin in a second, operative position, said scribing pin in the second operative position having a pointed end extending downwardly from the base.

These and other objects and advantages of the measuring tape device according to the present invention will become more apparent with reference to the following detailed description and drawings.

BRIEF DESCRIPTION OF THE DRAWINGS

FIG. is a perspective view of a first, preferred embodiment of the present invention;

FIG. 2 is a side elevational view of the embodiment of FIG. 1;

FIG. 3 is a front view of the embodiment of FIG. 1;

FIG. 4 is a bottom view of the embodiment of FIG. 1;

FIG. 5 is a rear view of the embodiment of FIG. 1;

FIG. 6 is a side elevational view of a second, preferred embodiment of the present invention;

FIG. 7 is a side elevational view of half of a housing of the embodiment of FIG. 6;

FIG. 8 is a rear view of the embodiment of FIG. 6; and

FIG. 9 is a front view of the embodiment of FIG. 6.

DETAILED DESCRIPTION OF THE PREFERRED EMBODIMENTS

Referring now to FIG. 1, a measuring tape device according to a first embodiment of the present invention is generally referred to by the numeral 10 and includes a housing 12 having a base 14, a rearward end 16, a forward end 18 and opposite sides 20 and 22.

A wound length of tape 24 is disposed in the housing 12 and is taken out in a direction in line with teh base 14. A scribing pin 26 is mounted in either of two mounting holes of the housing. The first mounting hole is in the rearward end 16 of the housing in the base portion 14, preferably in line with the direction of take-out of the tape 24 as shown in FIGS. 2 and 4. In FIG. 1, the scribing pin 26 is illustrated in a second, mounting hole (or mounting groove) located in the forward end 18 of the housing 12, also substantially in the base portion 14. The scribing pin 26, when in the second, operative position illustrated in FIG. 1, can be used to scribe circles. As an example, the forward end of the tape 24 is provided with a T-front blade 28 which is riveted to the distal end of the tape 24. This blade 28 can be used to secure the forward end of the tape as described previously in order to make a measurement. Also, the blade 28 can be used as a grip of pivot center, so that if the housing 12 is moved in an arcuate path with the radius defined by the length of tape between the blade 28 and the scribing pin 26, an arc or circle can be formed of any desired radius. Alternatively, the scribing pin 26 can be used to secure the housing 12 in a fixed position while the carpinter takes the forward end of the tape 24 towards and object to be measured or length to be measured.

Normally, tape measuring devices have an internal spring mechanism which automatically takes up the tape once the tape is taken out of the housing. The taken out length can be locked in place by sliding downwardly a sliding button 30. Normally, the measured distance is measured by attaching the forward end, of abutting the forward end against the beginning of the measured distance and then taking the tape out of the housing and moving the housing away from the forward end of the tape 24. With the scribing pin 26, however, it will become possible for the pin 26 having a pointed downwardly extending end to secure the housing to corresponding structure, such as a wooden beam, so that the housing can remain stationary while the forward end of the tape is moved away from the housing towards a measured object length. Thus, the scribing pin 26 can be used as a scribing tool for making circles, arcs or straight lines, or it can be use for securing the housing while the forward end of the tape 24 is moved towards an object to be measured or it can be used as a fixed position in the front hole or groove to act as a pivot point. The latter function cannot be performed by standard measuring tape devices since the spring return mmechanism usually develops a spring bias when the tape is taken out so that the housing would tend to follow the forward end of the tape if the forward end of the tape is taken to another location.

When the scribing pin 26 is not in use, it is stowed in the rearward end 16 of the housing 12, as shown in FIGS. 2, 4 and 5.

Another feature of the present invention, as illustrated in FIGS. 1, 2 and 4, is that the base 14 is contoured to form a grip 32. The grip 32 consists of an undulating surface which conforms to the user's fingers, thus making the device easier to handle and hold. Grips are not normally provided in the base 14 of measuring tape devices since a flat base is usually desirable for having a measured length of the base which can be added to a measured length of tape to provide a total measurement which includes the tape and the base.

In the embodiment of FIGS. 1-5, the second opening formed in the housing for the purpose of mounting the scribing pin 26 in the operative position is in fact a groove 34 or hole into which the scribing pin 26 can be snap-fitted. The upper end of the groove 34 is provided with an expanded area to receive the head of the pin 26.

Referring now to FIGS. 6-9, a second, preferred embodiment of the present invention is a measuring tape device which is generally referred to by the numeral 36. The device 36 includes a housing 38 having a base 40, a rearward end 42, a forward end 44 and opposite sides 46 and 48. A wound lenth of tape 50 is disposed in the housing 38 and is taken out in a direction in line with the base 40, as indicated by the directional arrow "A". The tape 50 is provided with a spring return mechanism 52 (details of which are not shown) for automatically taking up the tape after it has been taken out in conventional fashion. A scribing pin 54 is shown in FIG. 6 to be in both the stowed and the deployed positions. It would be understood that only one scribing pin 54 would be provided for each measuring tape device 36, and two scribing pins are illustrated only to show the two possible positions of the scribing pin 54.

Referring to FIG. 7, which is a side elevational view of one half of the housing 38, a first mounting hole 56 is provided in the housing 38 in the base 40 at the rearward end 42. Since the housing 38 consists of two molded halves, of which a first half 38a is illustrated in FIG. 7, the first mounting hole 56 may be formed as two axially split halves formed in each half of the housing. Each axially split half includes a small diameter portion 56a and a large diameter portion 56b. A plastic insert 58 is press fit into the large diameter portion 56b and has an internal bore 58a having a diameter slightly smaller than the diameter of the scribing pin 54. Thus, when the insert 58 is press-fit into the large diameter portion 56b of the mounting hole 56, the scribing pin 54 is held in the stowed position by the snug fitting of the outer diameter of the scribing pin 54 against the inner diameter of the internal bore 58a of the insert 58. The interference fit is sufficient to hold the pin 54 in a stowed position, in which the head 54a of the pin 54 is substantially abutting the rearward end 42.

A second mounting hole 60 is provided in the base 40 at the forward end 44 and, similar to the first mounting hole 56 includes a small diameter bore 60a and a larger diameter bore portion 60 b. A second insert 62 is snap fit into the large diameter bore portion 60b and provides the same function as the first insert 58, in that the interior bore 62a has a diameter slightly smaller than that of the outer diameter of the pin 54.

A sliding button 64 is provided to lock the tape 50 at a desired length. The pin 54 can be put in place by lifting the tape 50 upwardly and inserting the pin 54 in a downward direction transverse the direction "A". Thus, the embodiment of FIGS. 6-9 differs slightly from the embodiment of FIGS. 1-5 in that the pin is not press-fitted into an open groove but is instead inserted longitudinally of a bore or mounting hole 60.

A grip 66 is formed in the base 40 as an undulating surface designed to conform to the user's fingers. The grip 66 is a novel feature in that the distance between the base 40 and the sliding button 64 is diminished by having the undulating surface of the grip 66 create an overall slope towards the sliding button 64.

The present invention is particularly suitable for measuring tapes in the range of 8 feet to 30 feet. Tapes of substantially less length have an overall size which does not require a finger grip as disclosed in both embodiments of the present invention. Moreover, tapes of substantially greater length require housings which are not easily held by one hand and thus the importance of a finger grip becomes less important. That finger grip of either of the presently disclosed embodiments facilitates single-handed holding of the measuring tape device. Thus, the grip 66, for example, works in conjunction with a finger hole 68 to facilitate the aforementioned single-handed holding of the device.

Numerous modifications and adaptations of the present invention will be apparent to those so skilled in the art and thus, it is intended by the following claims to cover all such modifications and adaptations which fall within the true spirit and scope of the invention.

What is claimed is:

1. A measuring tape device comprising:
   a housing having a base, a rearward end, a forward end, and opposite ends;
   a wound length of tape disposed in the housing and being taken out in a direction in line with the base;
   a scribing pin;
   a first mounting hole disposed in the housing and mounting the scribing pin in a first, stowed position, said first mounting hole having a small diameter portion and a large diameter portion;
   a second mounting hole disposed in the base of the housing at the forward end and transverse the direction of tape take out, and mounting the scribing pin in a second, operative position, said scribing pin in the second operative position having a pointed end extending downwardly from the base, said seconding mounting hole having a small diameter portion and a large diameter portion; and further comprising a first insert press-fit into the large diameter portion of the first mounting hole and a second insert press-fit into the large diameter portion of the second mounting hole, wherein each insert has a bore which aligns with the small diameter portion of the corresponding mounting hole after being press-fit into the large diameter portion, and wherein the bore of each insert has a diameter slightly smaller than an outer diameter of the scribing pin so as to provide an interference fit between the scribing pin and both inserts.

2. A measuring tape device according to claim 1, wherein the first mounting hole is disposed in the base at the rearward end of the housing.

3. A measuring tape device according to claim 1, wherein the second mounting hole is a groove formed in the forward end of the housing.

4. A measuring tape device according to claim 1, further comprising a grip formed in the base of the housing towards the forward end of the housing.

5. A measuring tape according to claim 4, further comprising a finger hole formed in the base at the forward end of the housing and forming part of the grip.

6. A measuring tape device according to claim 1, wherein each insert is made of plastic material.

7. A measuring tape device according to claim 1, wherein the housing is made of two injected-moled halves, and the base includes the first and second mounting holes, a finger hole at the forward end of the housing and an undulating surface between the finger hole and the rearward end of the housing, the undulating surface and the finger hole forming a grip.

* * * * *